US012786706B2

United States Patent

(12) United States Patent
Gupta et al.

(10) Patent No.: US 12,786,706 B2
(45) Date of Patent: Nov. 3, 2026

(54) FRAMEWORK FOR AUTHENTICATING AND AUTHORIZING USER EQUIPMENTS (UES) FOR LOCALIZED SERVICES

(71) Applicant: Samsung Electronics Co., Ltd., Suwon-si (KR)

(72) Inventors: Naman Gupta, Suwon-si (KR); Kisuk Kweon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 475 days.

(21) Appl. No.: 18/364,765

(22) Filed: Aug. 3, 2023

(65) Prior Publication Data

US 2024/0048982 A1 Feb. 8, 2024

(30) Foreign Application Priority Data

Aug. 5, 2022 (KR) ........................ 10-2022-0098053

(51) Int. Cl.

*H04W 12/06* (2021.01)
*H04W 4/02* (2018.01)
*H04W 8/20* (2009.01)
*H04W 28/24* (2009.01)
*H04W 64/00* (2009.01)
*H04W 76/10* (2018.01)

(52) U.S. Cl.

CPC ............. *H04W 12/06* (2013.01); *H04W 4/02* (2013.01); *H04W 8/20* (2013.01); *H04W 28/24* (2013.01); *H04W 64/00* (2013.01); *H04W 76/10* (2018.02)

(58) Field of Classification Search

CPC ....... H04W 12/06; H04W 76/10; H04W 4/02; H04W 8/20; H04W 28/24; H04W 64/00; H04W 8/16; H04W 8/18; H04L 12/1407; H04L 63/0892

See application file for complete search history.

(56) References Cited

U.S. PATENT DOCUMENTS 12,302,215 B2 * 5/2025 Gundavelli ........... H04W 40/18
2008/0287094 A1 11/2008 Keeler et al.
2009/0043900 A1 2/2009 Barber (Continued)

FOREIGN PATENT DOCUMENTS

WO 2022/094064 A1 5/2022

OTHER PUBLICATIONS

3GPP TS 23.503: "Policy and charging control framework for the 5G System (5GS) Stage 2", V17.5.0 (Jun. 2022) (Year: 2022).*

(Continued)

*Primary Examiner* — Khawar Iqbal

(74) *Attorney, Agent, or Firm* — Jefferson IP Law, LLP

(57) ABSTRACT

The disclosure relates to a 5G or 6G communication system for supporting a higher data transmission rate. In accordance with an aspect of the disclosure, a method for providing localized service by a policy control function (PCF) in a wireless communication system, the method comprises receiving, from a localized service provider (LSP), first information including at least one of quality of service (QoS) profiles for different users, and information for time of service, and transmitting, to an access and mobility management function (AMF), second information related to authentication of the at least one user equipment (UE) which is connecting for the localized service.

6 Claims, 7 Drawing Sheets

(56) References Cited

U.S. PATENT DOCUMENTS

| | | | | |
|---|---|---|---|---|
| 2023/0199621 | A1* | 6/2023 | Cakulev | H04W 4/50 370/329 |
| 2023/0319681 | A1* | 10/2023 | Kiss | H04W 40/36 |
| 2023/0354178 | A1* | 11/2023 | Lin | H04W 48/18 |
| 2024/0283791 | A1* | 8/2024 | Salmela | H04L 63/0892 |
| 2025/0016041 | A1* | 1/2025 | Wang | H04L 41/0661 |
| 2025/0142508 | A1* | 5/2025 | Nayak | H04W 60/04 |
| 2025/0168635 | A1* | 5/2025 | Stojanovski | H04W 12/0433 |
| 2025/0193769 | A1* | 6/2025 | Gundavelli | H04W 40/18 |
| 2026/0019933 | A1* | 1/2026 | Tiwari | H04W 48/18 |

OTHER PUBLICATIONS

International Search Report and written opinion dated Oct. 27, 2023, issued in International Application No. PCT/KR2023/011360.
Extended European Search Report dated Apr. 3, 2025, issued in European Application No. 23850437.7.

* cited by examiner

FRAMEWORK FOR AUTHENTICATING AND AUTHORIZING USER EQUIPMENTS (UES) FOR LOCALIZED SERVICES

CROSS-REFERENCE TO RELATED APPLICATION(S)

This application is based on and claims priority under 35 U.S.C. § 119(a) of a Korean patent application number 10-2022-0098053, filed on Aug. 5, 2022, in the Korean Intellectual Property Office, the disclosure of which is incorporated by reference herein in its entirety.

BACKGROUND

1. Field

The disclosure relates to a method for authenticating and authorizing user equipments (UEs) for localized services.

2. Description of Related Art

Fifth generation (5G) mobile communication technologies define broad frequency bands such that high transmission rates and new services are possible, and can be implemented not only in "Sub 6 giga hertz (GHz)" bands such as 3.5 GHz, but also in "Above 6 GHz" bands referred to as mmWave including 28 GHz and 39 GHz. In addition, it has been considered to implement sixth generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive multiple-input multiple-output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random-access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and artificial intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to authenticate the user equipment (UE) if there is no agreement with the UE's home network and no agreement between the UE and the localized service portal.

Additional aspects will be set forth in part in the description which follows and, in part, will be apparent from the description, or may be learned by practice of the presented embodiments.

In accordance with an aspect of the disclosure, an external localized service provider that provides the network with information and parameters associated with the particular localized service is provided. The information includes QoS Profile for different level of users, authentication authorization accounting (AAA) server address, time of the service, max UEs supported for the localized service etc.

In accordance with another aspect of the disclosure, based on the received information from the external localized service provider, policy control function (PCF) can provide and configure the access and mobility management function (AMF) with the information associated with the localized service.

In accordance with another aspect of the disclosure, based on the received information from the external localized service provider, PCF can provide and configure the session management function (SMF) with the captive portal uniform resource locator (URL)/session redirection information to be used for the restricted protocol data unit (PDU) Session for localized services.

The disclosure provides a method which authenticates or authorizes the UE for availing particular localized service.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
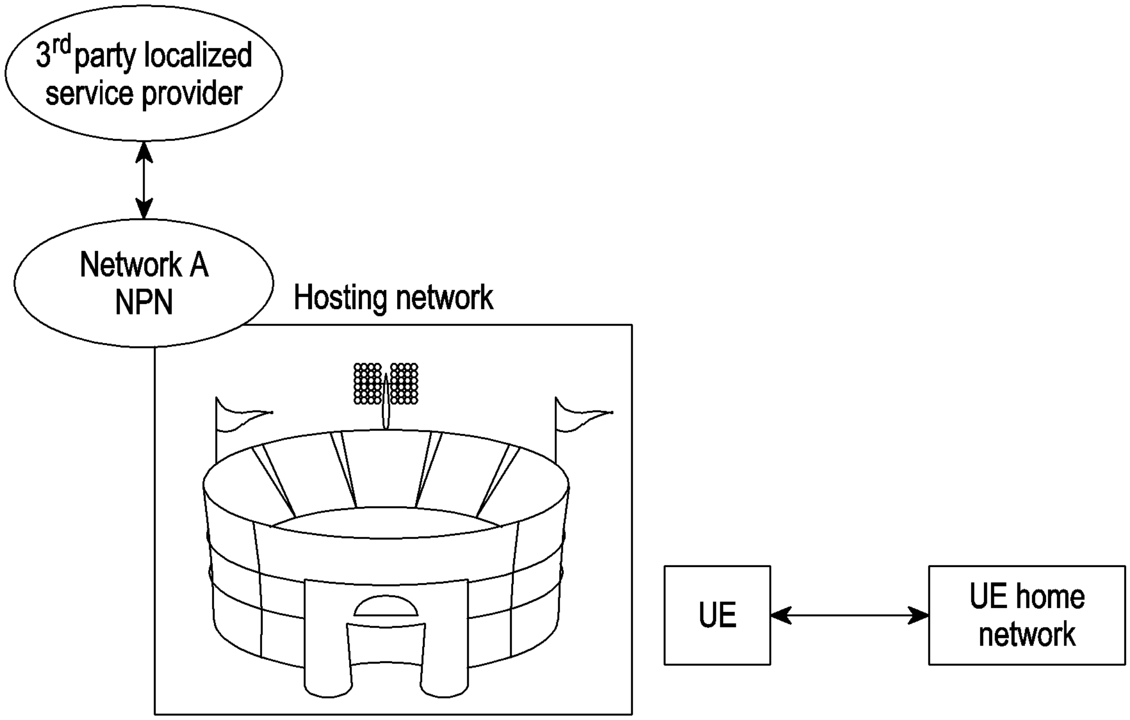
FIG. 1 illustrates a system including a 3rd party Localized service provider, a hosting network, a UE, and a UE home network according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Hereinafter, a base station is the entity that allocates resources to a terminal, and may be one of an eNode B, a gNode B, Node B, a base station (BS), a radio access network (RAN), an access network (AN), The case in which there is no a RAN node, a radio access, a base station controller, and a node on a network. The terminal may include an user equipment (UE), a mobile station (MS), a cellular phone, a smart phone, a computer, or a multimedia system capable of performing a communication function. In the disclosure, downlink (DL) refers to a wireless transmission path through which the BS transmits a signal to the UE, and uplink (UL) refers to a wireless transmission path through which the UE transmits a signal to the BS. Also, embodiments of the disclosure may be may be applied to other communication systems through some modifications without departing from the scope of the disclosure on the basis of the identification by those skilled in the art.

A term for identifying an access node used in the following description, a term referring to network entities, a term referring to messages, a term referring to an interface between network objects, or a term referring to various identification information are exemplified for convenience of description. Accordingly, the disclosure is not limited to the terms described below, and other terms referring to objects having equivalent technical meanings may be used.

Localized services are those which are provided at a specific or limited area and/or which may be bounded in time. These services can either be in the form of an application (E-game, on-demand audio/video etc.) or simply in the form of connectivity (UE to data network may offer better quality of service (QoS))).

A localized service provider (LSP) may be an application provider or network operator who makes their services localized and is offered to end user via a hosting network.

A hosting network may be a network which provides access to localized services.

Localized services provide many opportunities to users and service providers. Dynamic relationships can be made between various 3rd party service providers and the Hosting networks to provide its user particular services. The access to localized services can be provided in remote areas where regular network connectivity is not available; e.g. in a holiday camp site which is far from other infrastructure.

FIG. 1 illustrates a system including a 3rd party Localized service provider, a hosting network, a UE, and a UE home network according to an embodiment of the disclosure.

Referring to FIG. 1, the 3rd party Localized service provider (for example a sports organization which is organizing the match) has an agreement with the Hosting network which has better infrastructure and coverage around the stadium. Hosting network can agree to provide some services (for example better QoS, or access to an locally hosted application for ordering snacks) to the users which have some sort of credentials or who want to buy/get access to the premium services provided by the 3rd party LSP.

The UE is only configured with the credentials of its home network (home public land mobile network (HPLMN) or home stand-alone non-public network (SNPN)) which may or may not have agreement with the hosting network.

A main requirement for these kinds of services in the point of view of 3rd party LSP are:

1. Easily able to have dynamic relationships with the hosting Network,
2. Can easily authenticate the UEs for access to hosting network; or can easily provide UEs the credentials to access.

A main requirement for these kinds of services in the point of view of User are:

1. Easily to discover hosting network and know about localized services
2. Easy process for on-demand subscription for localized services.

When UE tries registration to an SNPN it can provide credentials (in the form of subscription concealed identifier (SUCI)) which can be authenticated by the SNPN itself. Otherwise, UE can also use the credentials for a credential holder, which is outside the scope of SNPN. For example by a authentication authorization accounting (AAA) server operated by a 3rd party.

As for the case of provisioning credentials to UE, UE gets the credentials from an external provisioning server after getting authenticated with the help of its default credentials.

The primary problem that lies in these scenarios is that UE must be configured with some credentials, which are used to authenticate the UE. If neither the hosting network has an agreement with the UE's home network, nor the UE and the local service provider have a pre-agreement, then it would be impossible for the UE to connect to the hosting network for utilizing localized services.

There needs to be a method where UE may get temporarily connected to the network, then user can register to the localized service portal (which may involve ID/Password or paying for the services) and then UE get authenticated and authorized to avail the localized services via the hosting network.

Also even if network is able to authenticate the UE primarily; the secondary authentication procedure are applicable either for slice or for protocol data unit (PDU) session creation or when the UE has the credentials of a Credential Holder.

The disclosure provides a method which authenticate or authorize the UE for availing particular localized service.

The main problem that this disclosure tackles is how to authenticate the UE if there is no agreement with the UE's home network and no agreement between the UE and the localized service portal.

For authenticating the UE by external server or provisioning the UE with the required credentials, session redirection (hotlining) procedure is very well known in the context of wireless local area network (WLANs). Doing similar procedure in the context of 3*rd* generation partnership project (3GPP) networks is also described in this disclosure.

As an example, referring to FIG. 1, only 1 LSP (example the baseball organization which is organizing the match) has agreement with the hosting network A to provide localized services. Now UE is configured with the credentials of its home network which do not have agreement with the hosting network A, and primary authentication of UE may not be possible if UE uses its home network credentials. UE is not configured with any credentials for the localized service.

Now due to UE's home network service being not available in the area or any other reason, user decides to manually select the hosting network A.

Now in this scenario since only a single 3rd party service is provided via the hosting network UE should be invoked some kind of notification or may be redirected to the particular 3rd party portal; where it can either decide to pay for the services or it may enter some information (ticket number etc.). After this the 3rd party portal can either notify the hosting network regarding successfully authorizing UE or it can provide UE the credentials to access to the hosting network A.

Main use cases include:

1. when a home network of the UE has no agreement with the home network nor a localized service provider,
2. when a UE has no subscription for the hosting network and no pre-agreement with the localized service provider (including the case where even Home network and Hosting network do not have any relationship).

Figure 5:
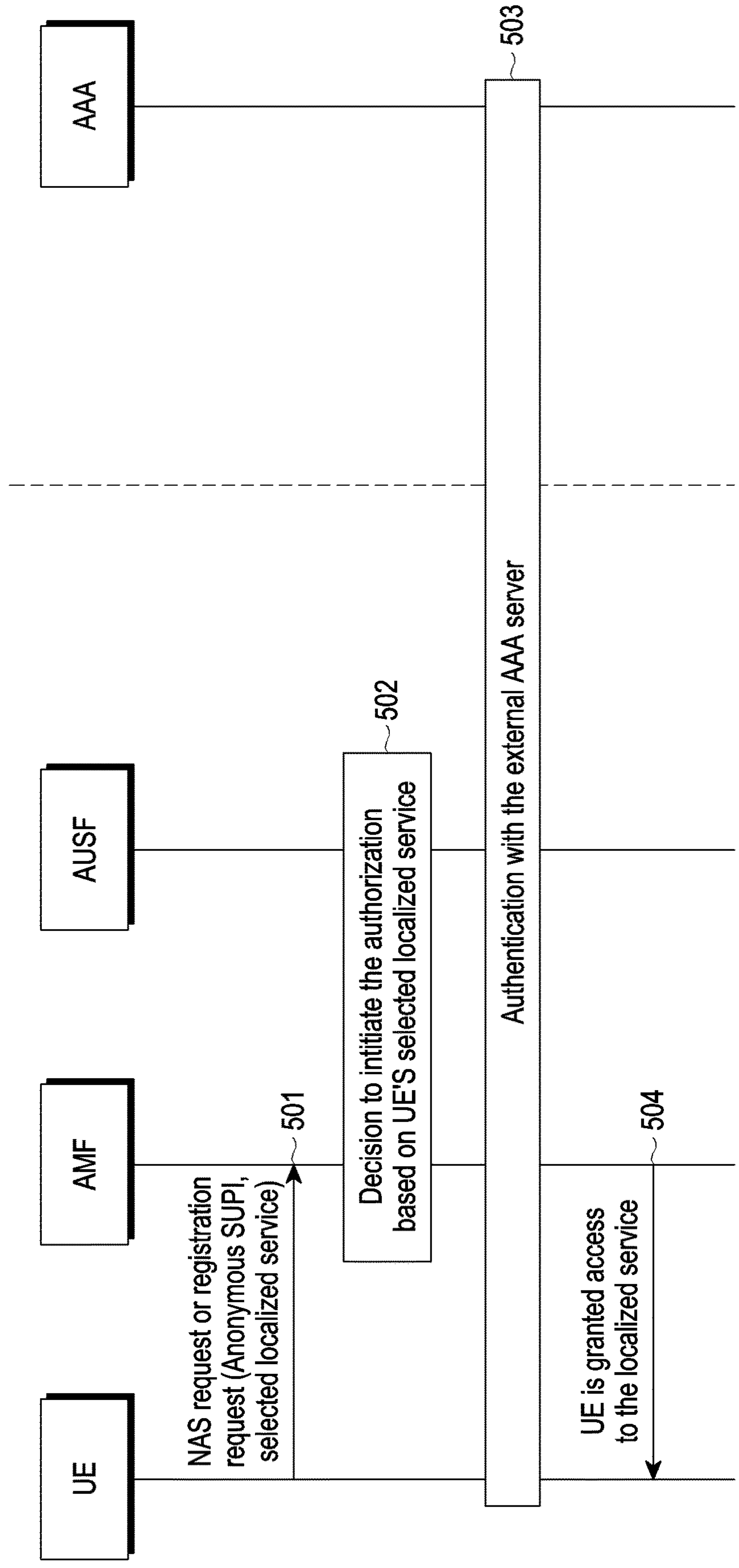
FIG. 5 illustrates an example of procedure for authentication for the particular localized service according to an embodiment of the disclosure.
Figure 6:
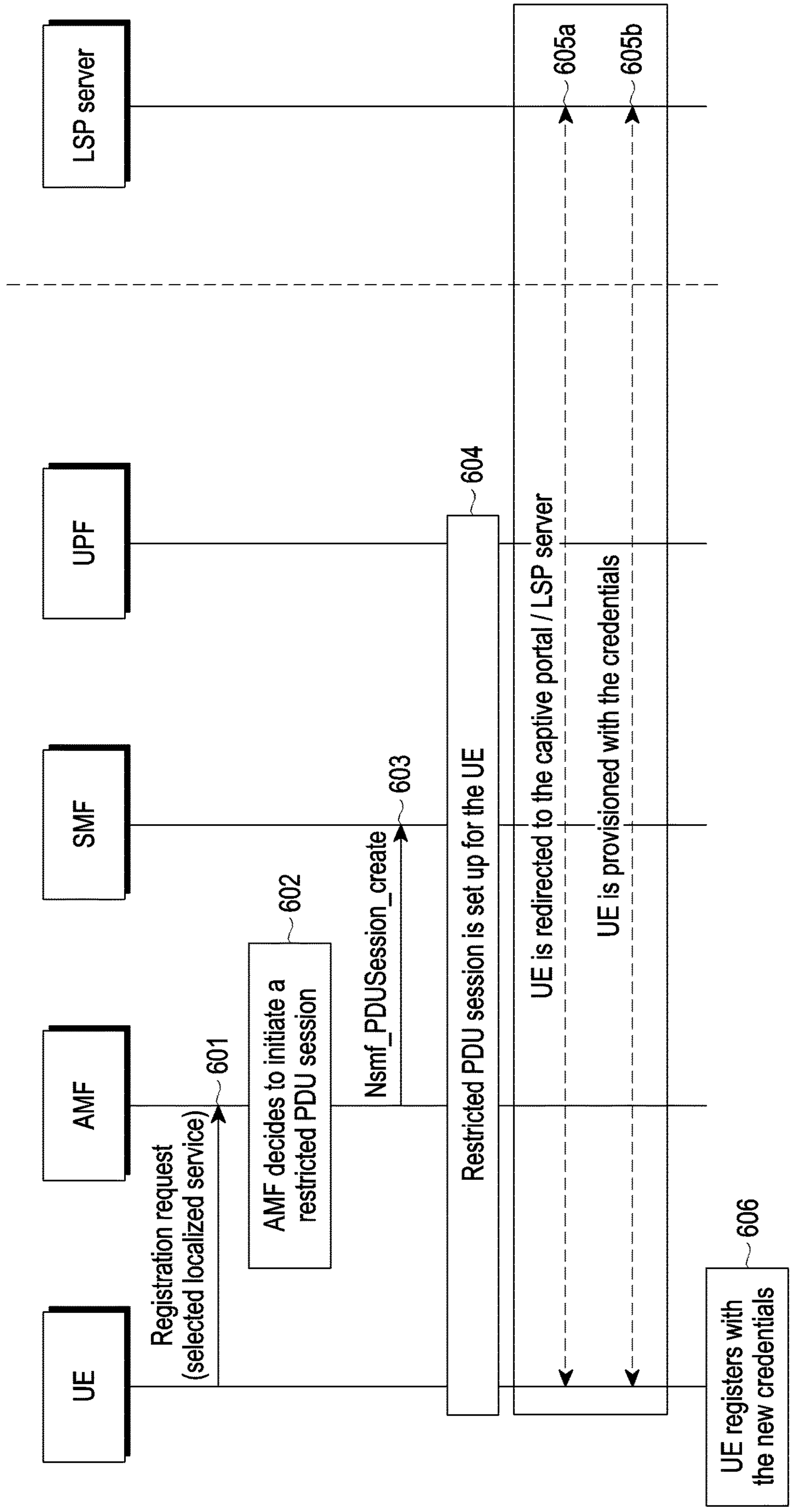
FIG. 6 illustrates an example of procedure for provisioning of credentials for localized service access according to an embodiment of the disclosure.

An overview of the procedures defined in this disclosure include:

1. creating a dynamic agreement between a hosting network and a localized service provider and configuring an access and mobility management function (AMF) and a session management function (SMF) specific to the localized service (FIG. 2),
2. a procedure of the UE getting to know about the localized service being offered or indicating the UE to perform registration for localized services (FIG. 3), 3. a secondary authentication via external server in case the UE can be primary authenticated via home credentials (FIG. 4 or FIG. 5), and
4. provisioning of credentials for localized services to the UE (including the case when UE is not primary authenticated) (FIG. 6).

Agreement Between LSP and Hosting Network

It is necessary that multiple LSPs are easily able to create dynamic service agreements with the Hosting network. Here the LSP can act as an application function to communicate with the hosting network and provide it the required policies.

Figure 2:
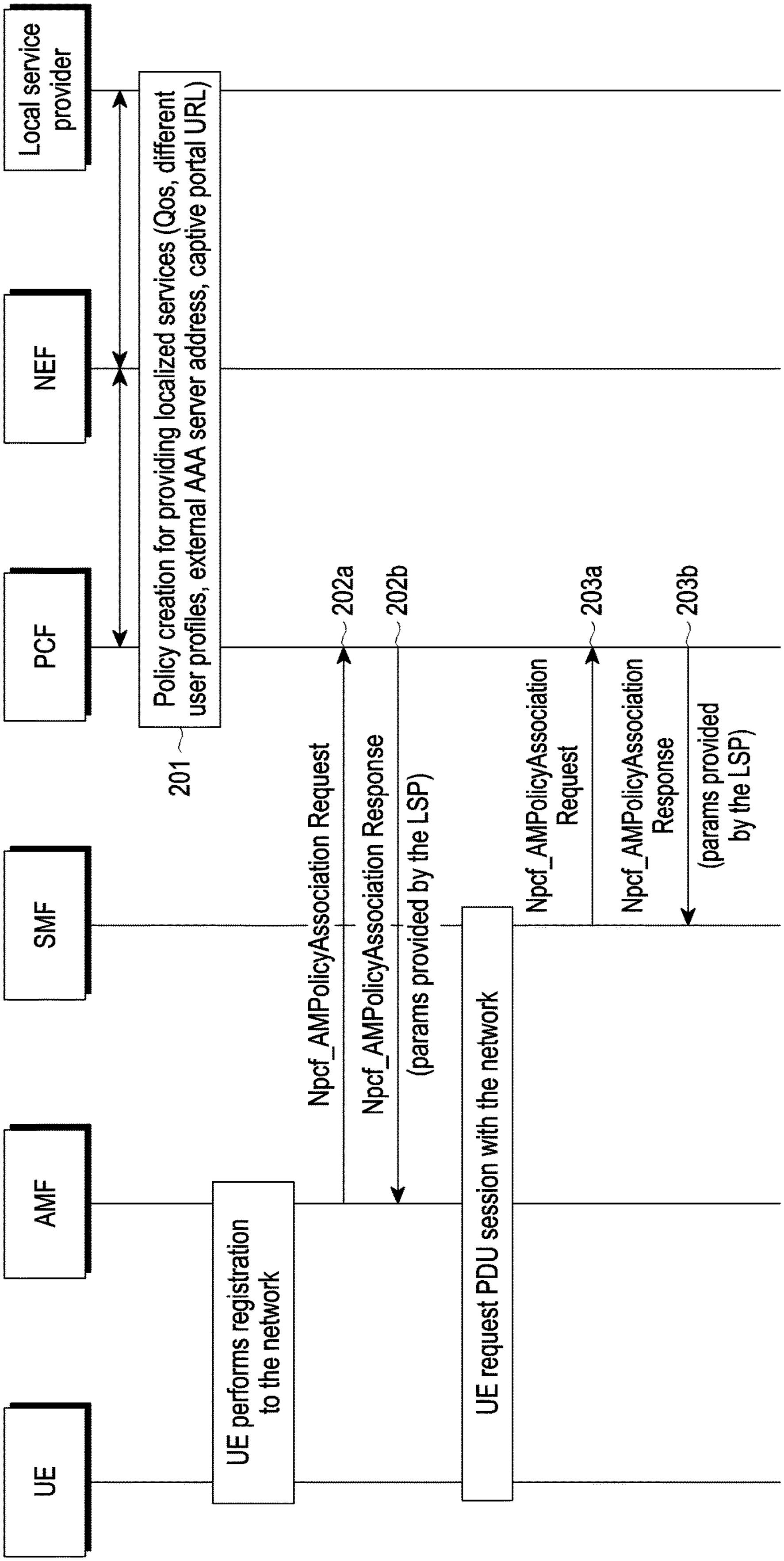
FIG. 2 illustrates an example of procedure for the agreement between localized service provider (LSP) and hosting network according to an embodiment of the disclosure.

FIG. 2 illustrates an example of procedure for the agreement between LSP and Hosting network according to an embodiment of the disclosure.

Referring to FIG. 2, the procedure may include the following operations:

In operation 201, the LSP to policy control function (PCF) (via network exposure function (NEF)): LSP provides PCF the necessary information relating to setting up the agreement.

The LSP may provide information related to at least one of:

1. QoS profiles for different users (users may be categorized as platinum, gold, silver etc.),
2. An agreement for session redirection for the users intending to avail the localized services,
3. a captive portal URL,
4. an AAA server Address: the address to which UE can be externally authenticated for the Localized service,
5. a time of the service, and
6. a maximum number of UEs supported, etc.

The above provided information may be identified by a unique localized service ID or a localized service name.

In operation 202*a* and operation 202*b*, PCF to AMF: the PCF may update the AMF configuration.

This may involve configuring the AMF regarding rules related to authentication of the UEs which are connecting for the localized service, in operation 202*a*. It may also indicate to the UE to create a restricted PDU session for the UEs for the particular Localized service.

PCF may provide this information to AMF using Npcf_AMPolicyAssociation Response, in operation 202*b*.

In operation 203*a* and operation 203*b*, PCF to SMF: the PCF updates SMF configuration/policy.

This may involve providing the captive portal URL to the SMF, in operation 203*a*.

PCF may provide this information to SMF using Npcf_SMPolicyAssociation Response, in operation 203*b*.

Meanwhile, some of the operations illustrated in FIG. 2 may be omitted, and additional operations may be further performed. The operations may be performed in an order different from the order illustrated in FIG. 2.

In accordance with an aspect of the disclosure, an external localized service provider can provide the network with information and parameters associated with the particular localized service. The information may include QoS profile for different level of users, AAA server address, time of the service, Max UEs supported for the localized service, etc.

In accordance with an aspect of the disclosure, based on the received information from the external localized service provider, PCF can provide and configure the AMF with the information associated with the localized service.

In accordance with an aspect of the disclosure, based on the received information from the external localized service provider, PCF can provide and configure the SMF with the captive portal URL/session redirection information to be used for the restricted PDU session for localized services.

A hosting network may indicate to UE about available localized services.

In the case when UE is not configured about the hosting network selection before, the UE needs to know about whether and which localized services are being offered by a particular hosting network.

Figure 3:
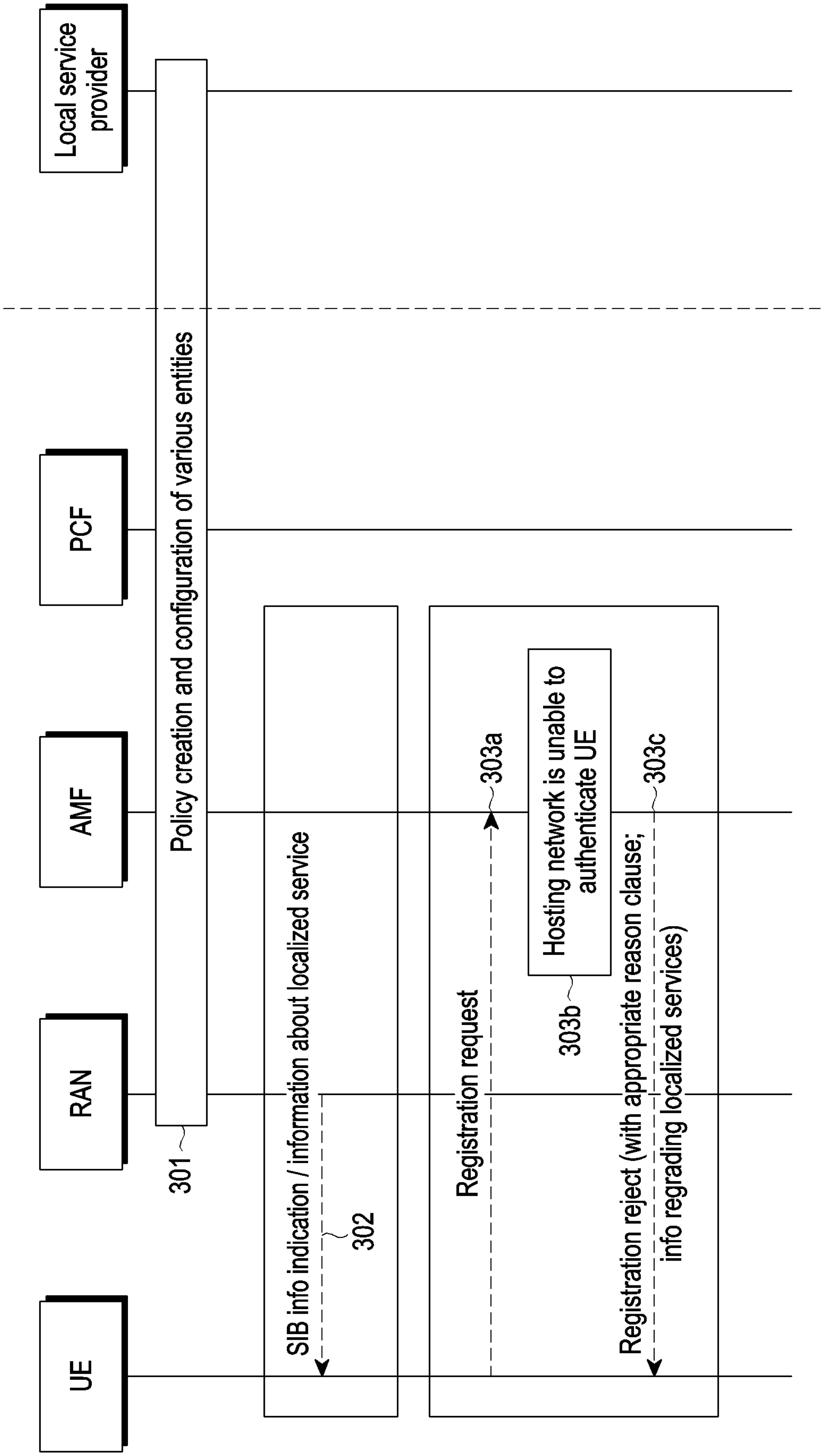
FIG. 3 illustrates an example of procedure for localized service info provision via hosting network according to an embodiment of the disclosure.

FIG. 3 illustrates an example of procedure for localized service info provision via hosting network according to an embodiment of the disclosure.

Referring to FIG. 3, the procedure may include the following operations:

In operation 301, a policy creation and updating configuration is performed, as per previous operations.

In operation 302, NG-RAN nodes can include localized service indication or information about the provided localized services in the system information block (SIB).

In operation 303*a*, operation 303*b*, and operation 303*c*, another way is when UE manually selects the network and network includes the information the registration response message.

In operation 303*a*, a user may manually select the network and UE sends registration request with the hosting network.

In operation 303*b*, a network performs authentication of the UE. The UE may not be able to get authenticated.

In operation 303*c*, a network sends localized service related info in the registration reject.

Information that the UE can receive may include at least one of:

a. an indication to perform registration in localized service mode,
b. a list of localized services available, or
c. an indication that provision for localized service is available (on-demand service is available).

Meanwhile, some of the operations illustrated in FIG. 3 may be omitted, and additional operations may be further performed. The operations may be performed in an order different from the order illustrated in FIG. 3.

Authentication for a particular localized service may be performed.

It may be necessary that the hosting network needs to authorize UE with an external server (3rd party localized service provider) so as to provide localized services to the UE.

So after the primary authentication takes place, the hosting network may decide to do secondary authentication with an external server based on either the UE's selection or via local configuration (for example if there is only a single localized service provider which currently has an agreement with the hosting network, secondary authorization automatically starts for that particular service).

The authentication procedure with the external localized service provider may also be done in UE's home network (or the UE's serving network) in case when the UE request for getting localized service related information (which may include the hosting network selection information) from the home network (resp. the UE's serving network).

Also even in the case when the UE cannot be primarily authenticated using home credentials, maybe because the UE's home network does not have an agreement with the hosting network, the hosting network may decide to perform authentication via external server.

This case is useful when the UE is not configured with credentials for the hosting network but the user manually selects the particular hosting network (and may also indicate the particular localized service).

First, there is the case when the UE can be authenticated using its home network credentials.

The operations 4, 5 and 6 can also be applied for the case when there is a need to authorize the UE by external LSP server for localized service related information.

Figure 4:
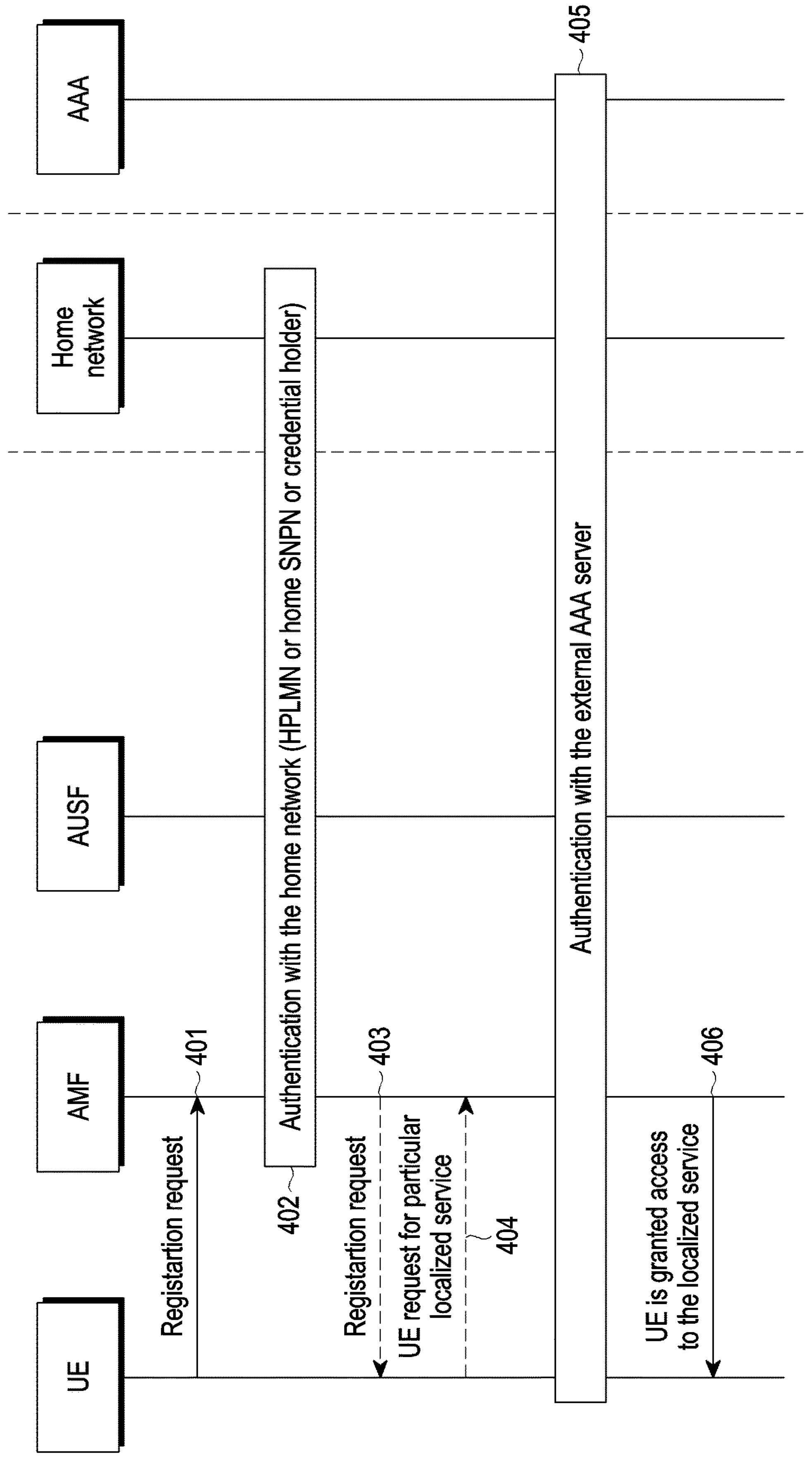
FIG. 4 illustrates an example of procedure for authentication for the particular localized service according to an embodiment of the disclosure.

FIG. 4 illustrates an example of procedure for authentication for the particular localized service according to an embodiment of the disclosure.

Referring to FIG. 4, the procedure are may include the following operations:

First, the user may manually select the particular hosting network. The user may be also shown a list of available localized services which user can select.

In operation 401, a registration request is sent from the UE to the AMF.

This may include the selected localized service, and/or an indication that the UE intends to access localized service.

In operation 402, an authentication with the home network is performed.

A UE is authorized with it's home network. The home network be notified about the indication sent by the UE that it intends to access localized service.

In operation 403, a registration accept is received by the UE.

A user receives a registration accept, this may include a list of localized services localized service information related to the localized services offered by the hosting network.

In operation 404, [conditional] A UE request for particular localized service is sent to the AMF.

This may include the name of the particular localized service. The user starting an application/scanning QR code or any other triggers may start this step.

In operation 405, authentication with the external LSP server is performed.

In operation 405, during the extensible authentication protocol (EAP) authentication user may be obliged to enter user/password or to agree to some conditions, etc.

In operation 406, the UE receives authorization success from the AMF.

After this, the hosting network lets the UE access the localized services.

In case when the procedure is in home network, the home network may provide UE the localized service information.

Meanwhile, some of the operations illustrated in FIG. 4 may be omitted, and additional operations may be further performed. The operations may be performed in an order different from the order illustrated in FIG. 4.

The main differentiating point is that authentication procedure is not based on UE's provided SUCI (or realm part of the SUCI) but based on user's selected localized service.

During registration request, the UE can notify the network by sending an indication that it intends to access localized services. Additionally, the UE can include the name of localized service in the request.

Based on the UE's sent indication and/or name of the localized service, the network can provide UE with localized service information.

Based on UE's provided localized service name, network choose the appropriate method/external server for authentication of the user for a Localized service.

Next we have the case when home network has no agreement with the hosting network or the 3rd party localized service provider. The user may be aware of the localized service being offered by a particular hosting network, but the UE may not be configured with any credentials related to authentication for this localized service.

This procedure is also useful in the cases when the hosting network is set up in a remote area where UE's home network connectivity is not present. The user is aware of the home network and has credentials for the localized service, but the UE is not configured with the credentials/subscription information.

FIG. 5 illustrates an example of procedure for authentication for the particular localized service according to an embodiment of the disclosure.

Referring to FIG. 5, the procedure are may include the following operations: prior to the start of operation 501, the UE manually selects the hosting network.

Since the home network of the UE does not have service agreement with the hosting network, the UE would not be able to automatically select and register with the home network. Since the user is aware of the hosting network and the localized services, the user may manually select the particular hosting network. The user may be shown or notified about the list of localized services as well which the user may chose.

In operation 501, the UE may send the registration request to hosting network.

Since the home network SUPI cannot be authenticated, the UE may send an anonymous SUPI with the name of localized service.

It may be possible that, previously, the UE tried to register with the home network credentials, but got a registration reject due to inability to authenticate the UE.

In operation 502, an AMF decides to initiate authorization.

The AMF may decide to initiate the authorization to the server based on UE's chosen localized service, or if UE did not include any localized service, AMF may initiate authorization to the default server (for example if only one localized service provider is providing services).

The information about the server for authorization was configured/provided to the AMF by PCF as in FIG. 2.

In operation 503, authorization with the external AAA server is performed.

The external server may utilize any EAP method. On the application layer, a user may be required to enter ID/password or some other actions.

An external server may now provide a UE identity to the hosting network, which will be used as UE identifier within the 5GS.

In operation 504, the UE is granted access to the localized services.

Meanwhile, some of the operations illustrated in FIG. 5 may be omitted, and additional operations may be further performed. The operations may be performed in an order different from the order illustrated in FIG. 5.

Provisioning of Credentials for Localized Service Access

In an embodiment, a solution may address the case when a user neither has a previous subscription to network A nor a previous service agreement with the 3rd party service provider.

In this case it is assumed that UE and the localized service provider do not have any prior agreement. This procedure is useful when UE needs get on-demand localized service from the hosting network but does not have any credentials.

Now there the possible way in which UE can request for a localized service on-demand is UE gets access to a restricted PDU session through which it can negotiate/buy subscription from the 3rd party. After the negotiation between UE and the Localized service portal is done, the portal provisions temporary credentials in the UE which it can use to register again with the Hosting network.

It may be possible that the UE is not primary authenticated (since it may be possible that UE's home network and the hosting network do not have any agreement.

FIG. 6 illustrates an example of procedure for provisioning of credentials for localized service access according to an embodiment of the disclosure.

Referring to FIG. 6, the procedure are may include the following operations:

In operation 601, the UE transmits a registration request to AMF.

The UE may indicate the selected localized service and may include an indication "for provision of credentials."

In operation 602, the AMF decides to establish a special PDU session.

This may be based on local configuration/policies provided by the PCF as done when relationship between hosting network and 3rd party LSP is set up (FIG. 3).

If the UE included the indication "for provision of credentials," the AMF may proceed to set up the Restricted PDU Session even if the UE is not authenticated.

In operation 603, the AMF may instruct the SMF to construct the PDU session.

The Nsmf_PDU_SessionCreate request from AMF to SMF may include the indication "for provision of credentials", which UE provided in Step 1.

In operation 604, a restricted PDU session may be set up.

The SMF configures the information regarding a localized service captive portal, so that the UE session can be redirected to the particular portal. This information regarding the localized service captive portal may be configured or provided by the PCF as done when relationship between hosting network and 3rd party LSP is set up (FIG. 3), The session may be time bounded.

In operation 605*a*, the UE may connect to the portal.

The UE's session may redirect to captive portal of the 3rd party (hotlining). The UE may be asked to pay for the subscription, enter ticket info etc.

In operation 605*b*, the portal provisions the credentials in the UE.

These may include temporary credential for the hosting network or credentials for an external AAA server (which is operated by the LSP).

In operation 606, the UE may register with the hosting network again with the new credentials.

Meanwhile, some of the operations illustrated in FIG. 6 may be omitted, and additional operations may be further performed. The operations may be performed in an order different from the order illustrated in FIG. 6.

Figure 7:
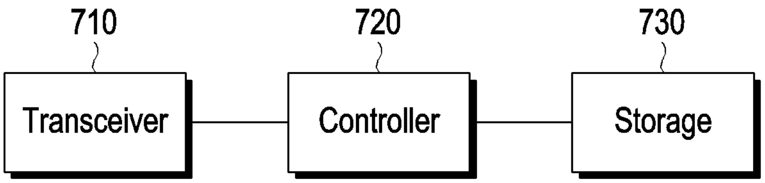
FIG. 7 illustrates a block diagram of a UE according to an embodiment of the disclosure.

FIG. 7 illustrates a block diagram of a UE according to an embodiment of the disclosure.

Referring to FIG. 7, the UE may include a transceiver 710, a controller 720, and storage 730. In the disclosure, the controller 720 may include a circuit, an ASIC, or at least one processor.

The transceiver 710 may transmit and receive signals to and from a base station or another network entity.

The controller 720 may control the overall operation of the network entity according to an embodiment. For example, the controller 720 may control the signal flow to perform the operations in FIGS. 1 to 6 described above.

The storage 730 may store at least one of information exchanged through the transceiver 70 and information generated by the controller 730.

Figure 8:
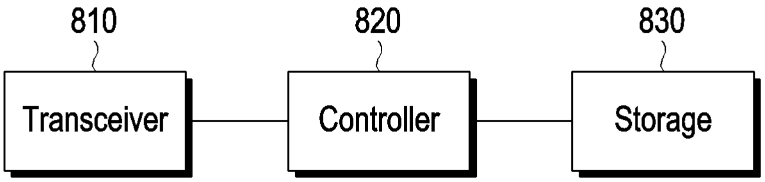
FIG. 8 illustrates a block diagram of a base station according to an embodiment of the disclosure.

FIG. 8 illustrates a block diagram of a base station according to an embodiment of the disclosure.

Referring to FIG. 8, the base station may include a transceiver 810, a controller 820, and storage 830. In the disclosure, the controller 820 may include a circuit, an ASIC, or at least one processor.

The transceiver 810 may transmit and receive signals to and from a terminal (UE) or another network entity.

The controller 820 may control the overall operation of the network entity according to an embodiment. For example, the controller 820 may control the signal flow to perform the operations in FIGS. 1 to 6 described above.

The storage 830 may store at least one of information exchanged through the transceiver 810 and information generated by the controller 830.

Figure 9:
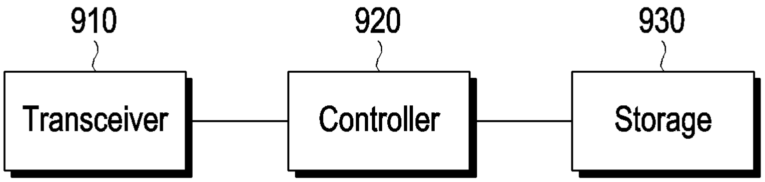
FIG. 9 illustrates a block diagram of a network entity according to an embodiment of the disclosure.

FIG. 9 illustrates a block diagram of a network entity according to an embodiment of the disclosure. The network entity (node) may correspond to one of the network entities shown in FIGS. 1 to 6. For example, the network entity may be one of the AMF, the SMF, the PCF, the NEF, the AUSF, the UPF, or the LSP.

Referring to FIG. 9, the network entity may include a transceiver 910, a controller 920, and storage 930. In the disclosure, the controller 920 may include a circuit, an ASIC, or at least one processor.

The transceiver 910 may transmit and receive signals to and from a terminal (UE) or another network entity.

The controller 920 may control the overall operation of the network entity according to an embodiment. For example, the controller 920 may control the signal flow to perform the operations in FIGS. 1 to 6 described above.

The storage 930 may store at least one of information exchanged through the transceiver 910 and information generated by the controller 930.

Meanwhile, the embodiments of the disclosure disclosed in the specification and the drawings have been presented to easily explain technical contents of the disclosure and help comprehension of the disclosure, and do not limit the scope of the disclosure. That is, it is obvious to those skilled in the art to which the disclosure belongs that different modifications can be achieved based on the technical spirit of the disclosure. Further, if necessary, the above respective embodiments may be employed in combination. For example, the base station, the UE and the network entity may operate on the basis of a combination of parts of the embodiments of the disclosure.

Although various embodiments of the disclosure have been shown and described in this specification and the drawings, they are used in general sense in order to easily explain technical contents of the disclosure, and to help comprehension of the disclosure, and are not intended to limit the scope of the disclosure. It is obvious to those skilled in the art to which the disclosure pertains that other modified embodiments on the basis of the spirits of the disclosure besides the embodiments disclosed herein can be carried out.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for providing localized service by a policy control function (PCF) in a wireless communication system, the method comprising:

receiving, from a localized service provider (LSP), first information including quality of service (Qos) profiles for different users, and information for time of service; and transmitting, to an access and mobility management function (AMF), second information related to authentication of at least one user equipment (UE) which is connecting for the localized service, wherein the first information further includes information for authentication authorization accounting (AAA) server, an agreement for session redirection for users intending to avail the localized service, a captive portal uniform resource locator (URL) and a maximum number of supported UEs, and wherein the second information indicates for the at least one UE to create a restricted protocol data unit (PDU) session for the localized service.

2. The method of claim 1, further comprising:

receiving, from a session management function (SMF), a policy association request message; and transmitting, to the SMF, a policy association response message including a captive portal URL.

3. The method of claim 1, further comprising:

receiving, from the AMF, a policy association request message before transmitting the second information.

4. A policy control function (PCF) for providing localized service in a wireless communication system, the PCF comprising:

a transceiver; and a controller coupled with the transceiver and configured to control to:

receive, from a localized service provider (LSP), first information including quality of service (QoS) profiles for different users, and information for time of service, and transmit, to an access and mobility management function (AMF), second information related to authentication of at least one user equipment (UE) which is connecting for the localized service, wherein the first information further includes information for authentication authorization accounting (AAA) server, an agreement for session redirection for users intending to avail the localized service, a captive portal uniform resource locator (URL) and a maximum number of supported UEs, and wherein the second information indicates for the at least one UE to create a restricted protocol data unit (PDU) session for the localized service.

5. The PCF of claim 4, wherein the controller is configured to control to:

receive, from a session management function (SMF), a policy association request message; and transmit, to the SMF, a policy association response message including a captive portal URL.

6. The PCF of claim 4, wherein the controller is configured to control to:

receive, from the AMF, a policy association request message before transmitting the second information.

* * * * *